United States Patent Office 3,551,413
Patented Dec. 29, 1970

3,551,413
BENZO-LACTAMS
John Krapcho, Somerset, N.J., assignor to E. R. Squibb
& Sons, Inc., New York, N.Y., a corporation of
Delaware
No Drawing. Continuation-in-part of application Ser. No.
567,831, July 26, 1966. This application Mar. 12, 1969,
Ser. No. 806,697
Int. Cl. C07d 41/00, 33/46
U.S. Cl. 260—239.3                             11 Claims

ABSTRACT OF THE DISCLOSURE

New compounds are provided having the general formula

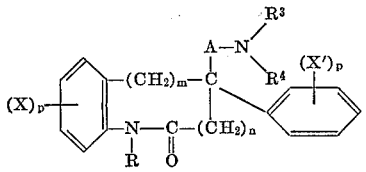

wherein X and X' are the same or different and can be hydrogen, lower alkyl, lower alkoxy and halogen; R can be lower alkyl, lower alkenyl, aryl loweralkyl, and aryl loweralkenyl; A is lower alkylene; and

is a basic nitrogen containing radical of less than fourteen carbon atoms; $p$ is 1, 2, or 3; $m$ is 1 or 2; and $n$ is 0 or 1. These compounds are useful as central nervous system stimulants.

---

This is a continuation-in-part of my application, Ser. No. 567,831, filed July 26, 1966, and now abandoned.

This invention relates to new compounds of the formula:

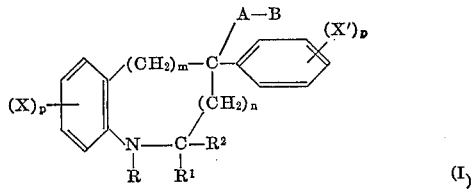

wherein X and X' are the same or different and are selected from the group consisting of hydrogen, lower alkyl, halogen, and lower alkoxy; R is selected from the group consisting of lower alkyl, lower alkenyl, aralkyl, and aralkenyl; $R^1$ and $R^2$ are hydrogen and together is oxo (O=); A is alkylene; B is a basic nitrogen containing radical of less than fourteen carbons; $p$ is 1, 2 tor 3; $m$ is 1 or 2; and $n$ is 0 or 1.

The term B is further defined as a nitrogen containing radical having the formula

wherein $R^3$ and $R^4$ are the same or different and are selected from the group consisting of hydrogen, lower alkyl, cyclopropylmethyl, alkene (e.g., allyl, 3,3-dimethylallyl); alkyne (e.g., propargyl), X-substituted phenyl; and X-substituted aralkyl (e.g., 4-chlorophenethyl); and $R^3$ and $R^4$ together are saturated heterocyclics having five to seven atoms in the ring. Heterocyclics represented by $R^3$ and $R^4$ are those having the formula

in which X' represents N—$R^6$, $CHR^6$, O or S, $t$ represents 1, 2 or 3 and $R^5$ and $R^6$ represent hydrogen, lower alkyl, hydroxy-lower alkyl, alkanoyloxy-lower alkyl, alkanoyloxy-lower alkoxy lower alkyl, hydroxy-lower alkoxy-lower alkyl, di(lower alkyl)-amino-lower alkyl, di(lower alkyl)amino-lower alkoxy-lower alkyl, X-substituted aryl and X-substituted aryl-lower alkyl. These may be exemplified by:

piperidino;
(lower alkyl)piperidyl [e.g., 2,3 or 4-(lower alkyl)piperidino], (lower alkoxy)piperidino;
pyrrolidino;
morpholino;
thiamorpholino;
piperazino;
(lower alkyl)piperazino (e.g., $N^4$-methylpiperazino);
di(lower alkyl)-piperazino;
(lower alkoxy)piperazino;
(hydroxy-lower alkyl)piperazino [e.g., $N^4$-(2-hydroxyethyl)piperazino];
alkanoyloxy lower-alkyl piperazino [e.g., $N^4$-(2-acetoxyethyl)piperazino, $N^4$-(2-heptanoyloxyethyl)piperazino, and $N^4$-(2-dodecanoyloxyethyl)piperazino];
(hydroxy-lower alkoxy-lower alkyl)piperazino [e.g., $N^4$-(2-hydroxyethoxyethyl)piperazino];
di(lower alkyl)amino-(lower alkyl)piperazino [e.g., $N^4$-dimethylaminoethylpiperazino];
di(lower alkyl)amino-(lower alkoxy-lower alkyl)piperazino [e.g., $N^4$ - (2 - dimethylaminoethoxyethyl)piperazino];
homopiperadino and homopiperazino and substituted homopiperazino [e.g., $N^4$ - ethylhomopiperazino, $N^4$-benzylhomopiperazino, and $N^4$-(hydroxyethyl)homopiperazino].

The preferred compounds are those compounds wherein $m$ is 1, $n$ is 0, $R^1$ and $R^2$ together is oxo; R is lower alkyl; A is a two-carbon alkylene; and B is diethylamino or morpholino.

The terms "lower alkyl," "lower alkoxy," and "lower alkylene" as employed herein include both straight and branched chain radicals of from one to eight carbon atoms and halogen is preferably chloro or bromo. The term "alkanoyloxy" includes radicals of up to fourteen carbon atoms.

The new bases of Formula I form acid-addition salts by reaction with the common inorganic and organic acids. Such inorganic salts as the hydrohalides, e.g., hydrobromide, hydrochloride, hydroiodide, sulfates, nitrates, phosphates, and so forth, and organic salts as acetate, oxalate, tartrate, malate, citrate, succinate, benzoate, ascorbate, salicylate, theophyllinate, camphorsulfonate, alkanesulfonate e.g., methanesulfonate, arylsulfonate, e.g., benzenesulfonate, toluenesulfonate, and the like, are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g., lower alkyl halides such as methyl chloride, methyl bromide, ethyl chloride, and so forth, lower alkyl sulfates such as methyl sulfate, ethyl sulfate, and so forth, monocyclic aryl(lower alkyl)halides and sulfates such as benzyl bromide, benzyl sulfate, and so forth. This is accomplished by reacting the base with the alkyl halide, sulfate, or the like.

The compounds of this invention, including the optically active forms and the acid-addition salts thereof, are therapeutically active compounds which possess central nervous system stimulant activity and hence are utilizable in the treatment of depression and also have control of obesity. Thus the compounds of this invention can be administered peroxally, the dosage for such treatment being adjusted for the activity of the particular compound employed. It is understood that the dosage may be administered from 0.01 to 100 mgs. per kg. of the mammalian host being treated. The compounds of this invention, wherein $R^1$ and $R^2$ are hydrogen also possess central nervous system modification activity.

The new compounds of Formula I are produced by converting a cyclic ketone of Formula II

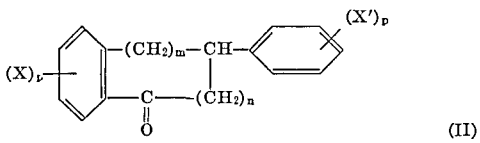

to compounds of Formula III by treatment with sodium azide in a medium such as acetic acid followed by concentrated sulfuric acid or by conversion of II to an oxime and then rearranging the oxime to the desired compound of Formula III by a Beckmann rearrangement, e.g., by treatment with an arylsulfonyl halide such as benzenesulfonyl chloride in a hydrogen halide acceptor such as pyridine

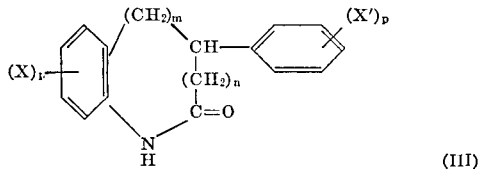

The starting reactants of Formula II wherein $m=1$ and $n=0$ in addition to being prepared by known methods may also be prepared by reacting a 2-nitro benzaldehyde having Formula IV

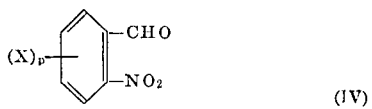

with a phenylacetic acid having Formula V

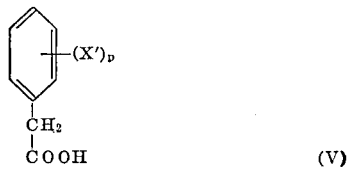

to form a compound having the Formula VI

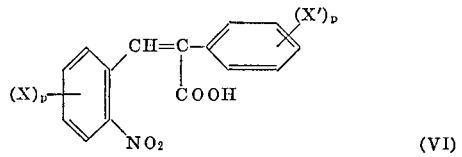

The compound of Formula VI is then cyclized by treatment with hydrogen in the presence of a catalyst such as palladium-carbon.

The lactan III is then alkylated with a dialkyl sulfate, such as dimethyl or dipropyl sulfate, alkyl halide such as methyl bromide or propyl iodide; alkenyl halides such as 6-chloro-1-hexane or 4-bromo-1-butene; aralkyl halide such as benzyl bromide or aralkenyl halide such as 3-chloro-1-phenylpropylene, 4-bromo-1-phenyl-1-butene in an inert solvent such as toluene, in the presence of a base such as sodamide, sodium hydride, potassium t-butoxide or powdered sodium hydroxide to yield the intermediate having the Formula VII

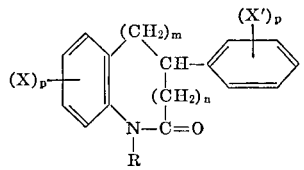

wherein R, X and p are as defined above. This intermediate is then reacted in an inert solvent such as toluene in the presence of a base such as sodamide, potassium butoxide or powdered sodium hydroxide with a basic halide of the Formula VIII Hal-alkylene-B to yield the desired compounds of Formula I. (Hal being halogen, preferably chlorine or bromine.)

The amido end product may be reduced as by reacting it with lithium aluminum hydride to form the end product wherein $R^1$ and $R^2$ are hydrogen.

The following examples are illustrative of the invention. All temperatures are in degrees centigrade:

EXAMPLE 1

3-(2-diethylaminoethyl)-3,4-dihydro-1-methyl-3-phenylcarbostyril, hydrochloride (A) Preparation of 3,4 - dihydro - 1-methyl-3-phenylcarbostyril.—A suspension of 22.0 g. of 3-phenylhydrocarbostyril in 200 ml. of toluene is added to a suspension of 3.9 g. of sodamide in 250 ml. of toluene. The mixture is refluxed for thirty minutes, cooled to room temperature and treated with 25.0 g. of dimethylsulfate. The mixture is refluxed for 2.5 hours, cooled and treated with 200 ml. of water. The organic phase is washed with 100 ml. of water, dried over magnesium sulfate and filtered. Concentration of the filtrate to 50 ml., followed by dilution with hexane until solution becomes turbid yields 19.3 g. of product, M.P. 85–95°. After purification of this material using acetonitrile and absolute alcohol, the product weighs 8.5 g., M.P. 95–97°.

(B) Preparation of 3-(2-diethylaminoethyl)-3,4-dihydro-1-methyl-3-phenyl - 3 - phenylcarbostyril, hydrochloride.—To a suspension of 1.7 g. of 50% sodium hydride in 85 ml. of dimethylformamide is added 8.3 g. of material from part A. The mixture is stirred and heated at 80–85° for thirty minutes, cooled to 25° and treated with a solution of 6.8 g. of 2-diethylaminoethyl chloride in 25 ml. of toluene. This mixture is refluxed for four hours and the solvent removed under reduced pressure. The residue is treated with 100 ml. of water and 100 ml. of ether. The aqueous phase is discarded and the organic phase extracted with a cold solution of 5 ml. of concentrated hydrochloric acid in 100 ml. of water. The aqueous layer is separated, treated with a solution of 4 g. of sodium hydroxide in 20 ml. of water and the free base extracted with ether. The ethereal solution is dried over magnesium sulfate, filtered and the solvent evaporated to give 3.2 g. of base. The latter is dissolved in 15 ml. of absolute alcohol, treated with 1.5 ml. of 7.7 N alcoholic hydrogen chloride and the solution diluted to 100 ml. of ether to give 2.0 g. of product, M.P. 195–198°. After recrystallization from 10 ml. of isopropyl alcohol, the colorless material weighs 1.5 g., M.P. 198–200°.

EXAMPLE 2

4-(2-diethylaminoethyl)-3,4,5,6-tetrahydro-1-methyl-4-phenyl-1-benzazocin-2(1H)-one, hydrochloride Following the procedure of Example 1 but utilizing an equivalent amount of 3,4,5,6-tetrahydro-4-phenyl-1-benzazocin-2(H)-one (prepared in accordance with the procedures set forth in copending application, Ser. No. 418,910, filed Dec. 16, 1964, and now U.S. Pat. No.

3,330,823, granted July 11, 1967) in lieu of 3 - phenylcarbostyril, the product recovered is 4 - (2 - diethylaminoethyl) - 3,4,5,6 - tetrahydro-1-methyl-4-phenyl-1-benzazocin-2(1H)-one, hydrochloride.

EXAMPLE 3

4-(3-piperidinopropyl)-3,4,5,6-tetrahydro-1-methyl-4-phenyl-1-benzazocine-2(1H)-one, hydrochloride Following the procedure of Example 1 but utilizing equivalent amounts of 3,4,5,6-tetrahydro-4-phenyl-1-benzazocin-2-(1H)-one in lieu of 3-phenylcarbostyril in part A and 3-piperidinopropyl in lieu of 2-diethylaminoethyl chloride in part B, the desired product is recovered.

EXAMPLE 4

3-(2-diethylaminoethyl)-4,5-dihydro-1-methyl-3-phenyl-1H-1-benzazepin-2(3H)-one, hydrochloride Utilizing an equivalent quantity of 4,5-dihydro-3-phenyl-1H-1-benzazapin-2(3H)-one in lieu of 3-phenylcarbostyril and otherwise following the procedure set forth in Example 1, the desired product is recovered.

EXAMPLE 5

3-(3-dimethylaminopropyl)-3,4-dihydro-1-methyl-3-phenylcarbostyril, hydrochloride Substituting an equivalent amount of 3-dimethylaminopropyl chloride for 2-diethylaminoethyl chloride of Example 1, there are obtained the free base and thereafter the salt.

EXAMPLE 6

3-(3-morpholinopropyl)-4,5-dihydro-1-methyl-3-phenyl-1H-1-benzazepin-2(3H)-one, hydrochloride By substituting an equivalent quantity of 3-morpholinopropyl chloride in the procedure of Example 1(B) and 4,5-dihydro-3-phenyl - 1H - 1 - benzazepin - 2(3H)-one in lieu of 3-phenylcarbostyril in the procedure of Example 1 (A), the desired product is recovered.

EXAMPLE 7

4 - (3 - piperidinopropyl) - 3,4,5,6 - tetrahydro - 4 - (o-chlorophenyl) - 1 - propyl - 1-benzazocin-2(1H)-one, hydrochloride (A) 3,4,5,6 - tetrahydro-4-(o-chlorophenyl)-1-propyl-1-benzazocin-2(H)-one.—Following the procedure of Example 1 (A) but utilizing 3,4,5,6-tetrahydro-4-(o-chlorophenyl)-1-benzazocin-2(1H)-one in lieu of 3-phenylcarbostyril and propyl iodide instead of dimethylsulfate, a crystalline material is recovered.

(B) 4-(3 - piperidinopropyl) - 3,4,5,6-tetrahydro-4-(o-chlorophenyl) - 1 - propyl - 1 - benzazocin-2(1H)-one, hydrochloride.—3,4,5,6 - tetrahydro-4-(o-chlorophenyl)-1-propyl-1-benzazocin-2H-one is reacted with 3-piperidinopropyl chloride in the manner described in Example 1 (B) to give a crystalline material.

EXAMPLE 8

4-[2-(1-hexamethylenimino)ethyl]-3,4,5,6 - tetrahydro - 1 - benzyl - 4 - o - tolyl - 1 - benzazocin - 2(1H) - one, hydrochloride (A) 3,4,5,6 - tetrahydro - 1 - benzyl - 4 - o - tolyl-1-benzazocin-2(H)-one.—Substituting equivalent quantities of 3,4,5,6-tetrahydro-4-o-tolyl-1-benzazocin - 2(H)-one for 3-phenylcarbostyril and benzyl chloride in lieu of dimethylsulfate in the procedure of Example 1 (A), a crystalline material is recovered.

(B) 4-[2-(1-hexamethylenimino)ethyl]-3,4,5,6 - tetrahydro-1-benzyl-4-o-tolyl - 1 - benzazocin - 2(1H) - one, hydrochloride.—3,4,5,6-tetrahydro - 1 - benzyl-4-o-tolyl-1-benzazocin-2H-one is reacted with 2(1-hexamethylenimino)ethyl chloride in the manner described in Example 1 (B) to give a crystalline material.

EXAMPLE 9

3-[3-(4-methylpiperazino)propyl]-4,5-dihydro-1-methyl-3-o-methoxyphenyl-1H-1-benzazepin-2-(3H)-one, hydrochloride (A) 4,5-dihydro-1-methyl - 3 - o - methoxyphenyl-1H-1-benzazepin-2(3H)-one.—Following the procedure of Example 1(A) but substituting 4,5-dihydro-3-o-methoxyphenyl-1H-1-benzazepin-2(3H)-one, there is a crystalline product.

(B) 3-[3-(4-methylpiperazino)propyl] - 4,5 - dihydro-1-methyl - 3 - (o-methoxyphenyl)-1H-benzazepin-2(3H)-one, hydrochloride.—By substituting 3-[1-(4-methylpiperazino)]propyl chloride in the procedure of Example 1(B) there is obtained a crystalline product.

EXAMPLE 10

4-(2-diethylaminoethyl)-3,4,5,6-tetrahydro-8,9-dimethoxy-1-methyl-4-(p-methoxyphenyl)-1-benzazocin-2(1H)-one, hydrochloride By replacing the 3-phenylcarbostyril with 3,4,5,6-tetrahydro - 8,9 - dimethoxy-4-(p-methoxyphenyl)-1-benzazocin-2(1H)-one in the procedure of Example 1, there is obtained 4-(2-diethylaminoethyl)-3,4,5,6-tetrahydro-8,9-dimethoxy - 1 - methyl-4-(p-methoxyphenyl)-1-benzazocin-2(1H)-one, hydrochloride.

EXAMPLE 11

3-(2-diethylaminoethyl)-4,5-dihydro-7,8-dimethoxy-1-methoxyphenyl)-8-methyl-1H-1-benzazepin-2(3H)-one, hydrochloride By replacing 3-phenylhydrocarbostyril with 4,5-dihydro-7,8-dimethoxy - 3 - (p - methoxyphenyl)-1H-1-benzazepin-2(3H)-one in Example 1, there is obtained 3-(2-diethylaminoethyl) - 4,5 - dihydro-7,8-dimethoxy-1-methyl-3-(p-methoxyphenyl)-1H-1-benzazepin - 2(3H) - one, hydrochloride.

EXAMPLE 12

3-(2-diethylaminoethyl)-4,5-dihydro-1-methyl-3-(p-methoxyphenyl)18-methyl-1H-1-benzazepin-2(3H)-one, hydrochloride By replacing the 3-phenylhydrocarbostyril with 4,5-dihydro-3-(p-methoxyphenyl) - 8 - methyl-1H-1-benzazepin-2(3H)-one in Example 1, there is obtained 3(2-dimethylaminoethyl) - 4,5 - dihydro - 1 - methyl-3-(p-methoxyphenyl) - 8 - methyl-1H-1-benzazepin-2(3H)-one, hydrochloride.

EXAMPLE 13

4-(2-diethylaminoethyl)-1,3,4,5-tetrahydro-1-methyl-4-phenyl-1-benzazocin-2(1H)-one, methiodide A solution of 5.0 grams of the free base of 4-(2-diethylaminoethyl)-1,3,4,5-tetrahydro - 1 - methyl-4-phenyl-1-benzazepin-2(1H)-one as prepared in Example 15 in 200 ml. of acetonitrile is treated with 5 grams of methyl iodide. The reaction mixture is allowed to stand at room temperature and the solvent is removed under reduced pressure. The residue is triturated with anhydrous ether and crystallized from a mixture of ethanol and ether.

EXAMPLE 14

3-[2-(diethylamino)ethyl]-1,2,3,4-tetrahydro-1-methyl-3-phenylquinoline, hydrochloride Treating 5.0 grams of the product of Example 1(B) with lithium aluminum hydride yields 3-[2-(diethylamino)ethyl] - 1,2,3,4 - tetrahydro - 1 - methyl-3-phenylquinoline, hydrochloride.

EXAMPLE 15

4-(2-diethylaminoethyl)-1,3,4,5-tetrahydro-1-methyl-4-phenyl-2H-1-benzazepin-2-one (A) 1,3,4,5-tetrahydro - 1 - methyl-4-phenyl-2H-1-benzazepin-2-one.—Substituting 1,3,4,5-tetrahydro-1-methyl- 4-phenyl-2H-1-benzazepin-2-one in the procedure of Example 1(A), the product is recovered.

(B) 4-(2-diethylaminoethyl) - 1,3,4,5 - tetrahydro-1-methyl - 4 - phenyl-2H-1-benzazepin-2-one.—Substituting the product of Example 13(A) in lieu of 3-phenylhydrocarbostyril yields the desired product.

The invention may be variously otherwise embodied within the scope of the appended claims.

What is claimed is:
1. A substance selected from the group consisting of a compound having the formula

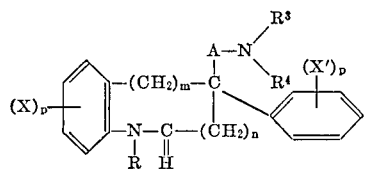

pharmaceutically acceptable acid-addition salts thereof and quaternary ammonium salts thereof with lower alkyl and phenyl-(lower alkyl) halides and sulfates, wherein X and X' are the same or different and are selected from the group consisting of hydrogen, lower alkyl, halogen and lower alkoxy; R is selected from the group consisting of lower alkyl, lower alkenyl, phenyl lower alkyl and phenyl lower alkenyl; A is lower alkylene;

is a basic nitrogen containing radical of less than fourteen carbons wherein $R^3$ and $R^4$ are selected from the group consisting of hydrogen, lower alkyl, cyclopropylmethyl, alkenyl having from three to five carbon atoms, alkyryl having four carbon atoms, X-substituted phenyl; and halo-substituted phenyl lower alkyl; and $R^3$ and $R^4$ together are piperidino; (lower alkyl)piperidino; (lower alkoxy) piperidino; pyrrolidino; morpholino; thiamorpholino, piperazino; (lower alkyl)piperazino; di(lower alkyl)piperazino; (lower alkoxy)piperazino; (hydroxy-lower alkyl) piperazino; alkanoyloxy-lower-alkyl piperazino having from two to twelve carbon atoms in the alkanoyloxy group; (hydroxy-lower alkoxy-lower alkyl)piperazino; di-(lower alkyl)amino-(lower alkyl)piperazino; di(lower alkyl)amino-(lower alkoxy-lower alkyl)piperazino; homopiperidino; and homopiperazinyl; p is 1, 2 or 3; m is 1 or 2; and n is 0 or 1.

2. A compound having the formula

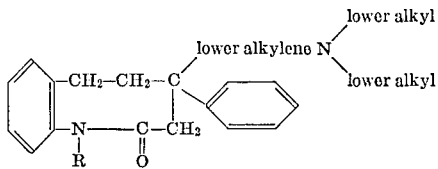

wherein R is as defined in claim 1.

3. A compound having a formula in accordance with claim 2 having the name 4-(2-diethylaminoethyl)-3,4,5,6-tetrahydro-1-methyl-4-phenyl-1-benzazocin-2(1H)-one.

4. A compound having a formula in accordance with claim 1 having the name 4-(3-piperidinopropyl)-3,4,5,6-tetrahydro-1-methyl-4-phenyl-1-benzazocin-2-(1H)-one.

5. A compound having the formula

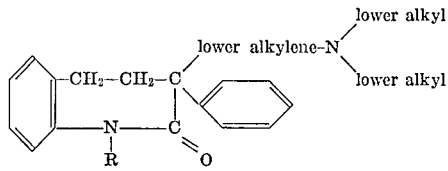

wherein R is as defined in claim 1.

6. A compound having a formula in accordance with claim 5 having the name 3-(2-diethylaminoethyl)-4,5-dihydro-1-methyl-3-phenyl-1H-1-benzazepin-2(3H)-one.

7. A compound of the formula

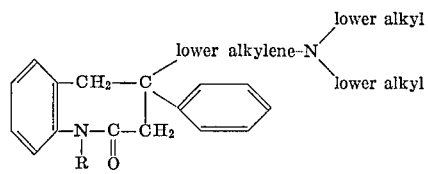

wherein R is as defined in claim 1.

8. A compound having a formula in accordance with claim 7 having the name 4-(2-diethylaminoethyl)-1,3,4,5-tetrahydro-1-methyl-4-phenyl-2H-1-benzazepin-2-one.

9. A compound of the formula

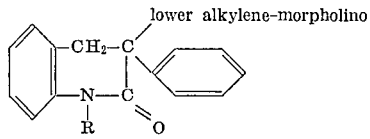

wherein R is as defined in claim 1.

10. A compound in accordance with claim 1 having the name 3-[2-(diethylamino)ethyl]-1,2,3,4-tetrahydro-1-methyl-3-phenylquinoline, hydrochloride.

11. A compound in accordance with claim 1 having the name 3-(2-diethylaminoethyl)-3,4-dihydro-1-methyl-3-phenylcarbostyril, hydrochloride.

References Cited

UNITED STATES PATENTS 3,341,519    9/1967    Krapcho _____ 260—239.3

HENRY R. JILES, Primary Examiner

R. T. BOND, Assistant Examiner

U.S. Cl. X. R.

260—240, 247, 268, 288, 289; 424—244, 246, 248, 250, 267, 274

PO-1050
(5/69)

UNITED STATES PATENT OFFICE
CERTIFICATE OF CORRECTION

Patent No. 3,551,413      Dated December 29, 1970

Inventor(s) John Krapcho

It is certified that error appears in the above-identified patent and that said Letters Patent are hereby corrected as shown below:

Column 2, line 18, "piperidyl" should read --piperidino--.
Column 3, line 9, "peroxally" should read --perorally--.
Column 4, line 44, "methyl-3-phenyl-3-phenylcarbostyril" should read --methyl-3-phenylcarbostyril--.  Column 6, line 30, "dimethoxy-1-methoxyphenyl)-8-methyl-1H" should read --dimethox 1-methyl-3-(p-methoxyphenyl)-1H--; and on line 41, "18-" shoul read-- -8- --.  Column 7, first formula,

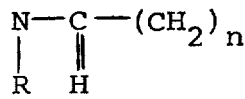     should read     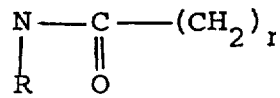

Column 7, line 35, "alkyryl" should read --alkynyl--.

Signed and sealed this 3rd day of August 1971.

(SEAL)
Attest:

EDWARD M. FLETCHER, JR.          WILLIAM E. SCHUYLER, JR.
Attesting Officer                Commissioner of Patents